United States Patent [19]

Lambros

[11] 4,137,832
[45] Feb. 6, 1979

[54] WHISTLING COFFEE POT

[76] Inventor: Emanuel E. Lambros, 40-11th St., Wheeling, W. Va. 26003

[21] Appl. No.: 903,039

[22] Filed: May 5, 1978

[51] Int. Cl.² ............................................. A47J 31/00
[52] U.S. Cl. ...................................................... 99/285
[58] Field of Search ................. 99/285, 308, 310, 313, 99/314, 303, 319

[56] References Cited

U.S. PATENT DOCUMENTS

| 4,587 | 6/1846 | Hart | 12/111 |
|---|---|---|---|
| 45,787 | 1/1865 | Young | 99/303 |
| 95,959 | 10/1869 | Warner | 99/308 |
| 207,952 | 9/1878 | Davis | 99/310 |
| 579,666 | 3/1897 | Wigginton | 99/285 |
| 767,595 | 8/1904 | Pike | 99/308 |
| 1,008,602 | 11/1911 | Lake | 99/310 |
| 1,161,713 | 11/1915 | Madsen | 126/388 |
| 1,624,606 | 4/1927 | Lane | 99/308 |
| 1,841,150 | 1/1932 | Porter | 99/310 |
| 2,224,409 | 12/1940 | Schleyer | 99/308 |
| 2,507,934 | 5/1950 | Reichart | 126/388 |
| 2,515,299 | 7/1950 | Foster | 57/125 |
| 2,560,124 | 7/1951 | Cameron | 99/319 |
| 2,623,450 | 12/1952 | Wier | 99/310 |
| 2,630,113 | 3/1953 | Zide | 99/285 |
| 2,817,285 | 12/1957 | Terce | 99/303 |

Primary Examiner—Robert W. Jenkins
Attorney, Agent, or Firm—Cushman, Darby & Cushman

[57] ABSTRACT

A coffee maker that provides both a visual and audible indication of the progress of coffee making. The coffee pot spout has a whistle disposed on its end, the whistle may be removable and/or the coffee may be poured directly through passageways in the whistle. A knob of non-conductive material is provided on the end of the whistle to facilitate removal. The centrally extending basket supporting tube in the coffee pot extends upwardly into a transparent material dome on the coffee lid. A screen is provided at the bottom of the tube, and a screen is disposed in the lid, securely mounting the tube in position. The basket is mounted on the tube so that it is normally immersed in water in the pot during normal operation.

12 Claims, 7 Drawing Figures

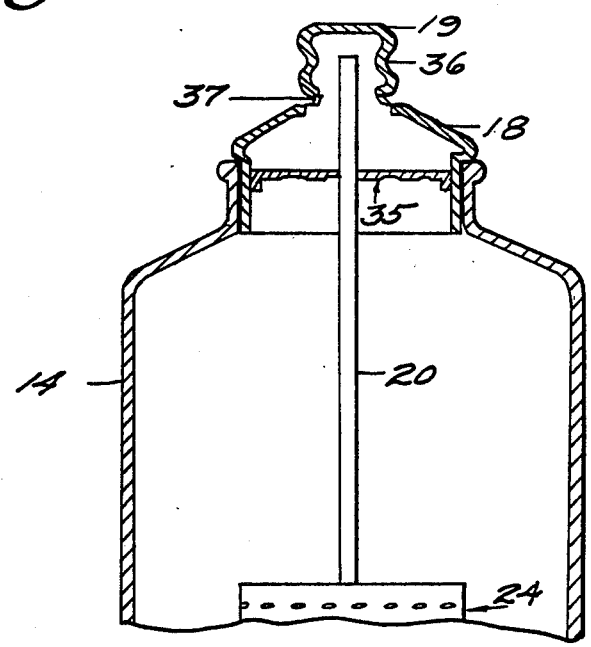
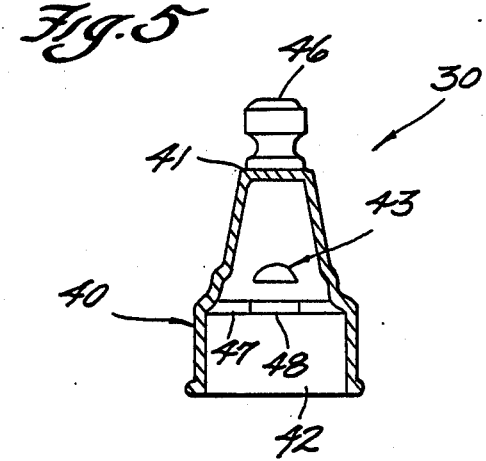
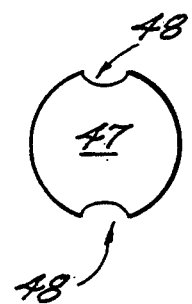
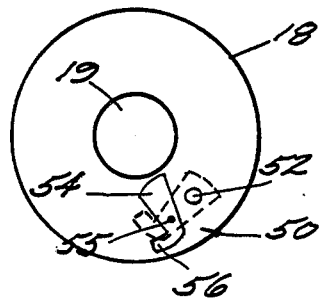

WHISTLING COFFEE POT

BACKGROUND AND SUMMARY OF THE INVENTION

The invention relates to a coffee pot having structures associated therewith that can provide both a visual and audible indication of the progress the coffee is making. In the past, there have been various proposals for providing audible indicators on coffee pots, such as shown in U.S. Pat. Nos. 579,666 and 2,630,113; however, such audible means are located in a position such that a visual indication of the coffee strength is not necessarily provided, and/or it is necessary to provide a stopper in the pot spout. According to the present invention, however, a visual indication of coffee strength is provided by the passage of the basket supporting tube into a transparent material dome on the lid, and the audible indication that the water in the coffee pot has started to boil is provided by a separate and distinct indicating means, which comprises a whistle means disposed on the coffee pot spout. The whistle means may have a nonconductive material knob formed thereon so that it is readily removable to facilitate pouring of the coffee through the spout, or the passageways in the spout may be formed so that the coffee may be poured with the whistle means in place on the spout.

Also, according to the present invention, other features are provided that enhance the coffee flavor while minimizing the amount of coffee that need be used. The basket is mounted on the tube so that it is near the base supporting the tube at the pot bottom, so that the coffee is normally immersed in the water during operation. Screens are provided at the tube base and inside the pot lid, and a plurality of openings are formed around the pot base to facilitate the passage of water upwardly through the tube. The screen disposed in the pot lid provides a snug fit for the tube to positively mount it in place extending upwardly into the transparent material dome, but is mounted below the top of the tube. The snug mounting of the tube in the lid is especially important since the basket is located so far down within the pot, and therefore does not provide a good guiding function as in conventional pots (i.e. U.S. Pat. No. 1,841,150).

It is the primary object of the present invention to provide an improved coffee pot. This and other objects of the invention will become clear from an inspection of the detailed description of the invention, and from the appended claims.

BRIEF DESCRIPTION OF THE DRAWINGS

FIG. 4 is a cross-sectional view of a top portion of the coffee maker of FIG. 1 when assembled;

FIG. 5 is a side view partly in cross section and partly in elevation of exemplary whistle means according to the invention;

FIG. 6 is a top plan view of the plate disposed in the whistle cap of FIG. 5; and FIG. 7 is a top plan view of the lid of the coffee maker of FIG. 1.

DETAILED DESCRIPTION OF THE DRAWINGS

Figure 1:
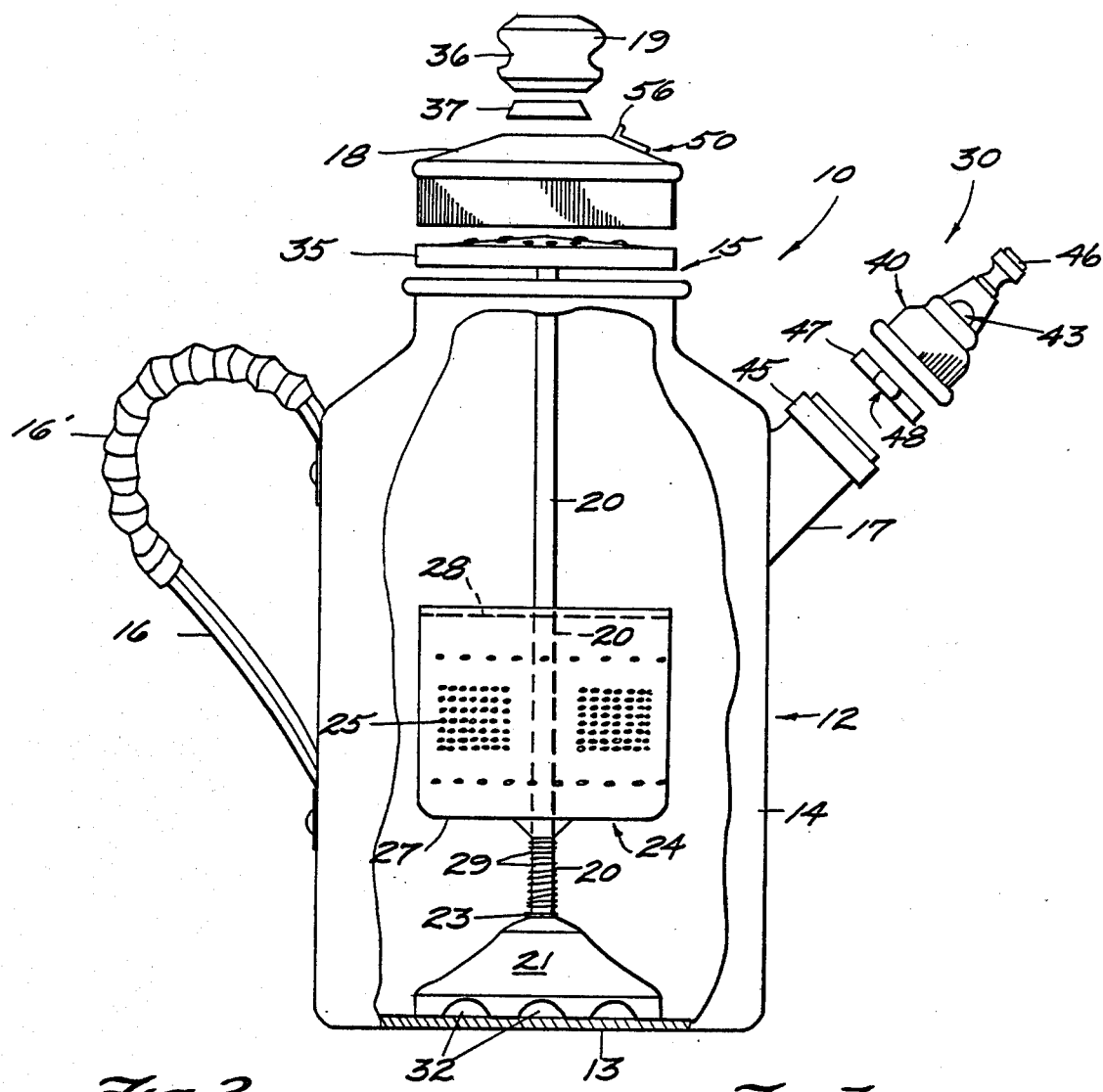
FIG. 1 is a side exploded view of an exemplary coffee maker according to the present invention, with the pot sidewall cut away to illustrate the interior components.

An exemplary coffee maker according to the present invention is shown generally at 10 in FIG. 1. The coffee maker 10 includes a pot 12 having a closed bottom 13, a circumferentially continuous sidewall 14, and an open top 15. A handle 16 extends from the sidewall, and may include heat insulating materials 16' wrapped around the grasping portion thereof (or it may be made of heat insulating material), and a spout 17 extends from a portion of the sidewall 14 opposite the handle 16. A lid 18 is provided for closing the open top 15 of the pot 12, the lid 18 including a dome 19 of transparent material (glass) located centrally of the lid 18. A tube 20 supported by a hollow base 21 is removably mounted within the pot 12, the tube having a length such that when the tube base 21 is disposed on the pot bottom 13, supporting the tube 20, the top of the tube 20 extends into the glass dome 19 (see FIG. 4). By viewing coffee perculating through the tube into the dome 19, one can see the strength of the coffee.

The tube 20 also has a basket supporting manifestation 23 formed thereon for supporting a basket 24. The basket 24 is conventional, having a perforated continuous sidewall 25, a perforated bottom 27, and preferably a perforated top 28, the basket for receipt of coffee grounds. A tubular central portion 26 is also provided in the basket 24, the diameter of the portion 26 being only slightly greater than the tube 20 diameter so that the tube 20 is snugly received by the portion 26. The basket forming manifestation 23 preferably is formed on the tube 20 adjacent or directly on the base 21, and a spring 29 is disposed between the manifestation 23 and the bottom 27 of the basket 24, as is conventional. The manifestation 23 is positioned so that the basket 24 will be immersed in the water in the pot 12 during normal operation of the coffee maker 10. By positioning the basket in this manner, the coffee flavor may be enhanced, and results in a reduction of about 40 to 60% in the amount of coffee grounds that are necessary to make a given amount of coffee.

In order to provide audible indicating means according to the present invention, in addition to the visual indicating means, whistle means 30 are disposed on the spout for indicating when boiling of water in the pot has been initiated by audibly releasing built-up steam from the pot 12.

Figure 2:
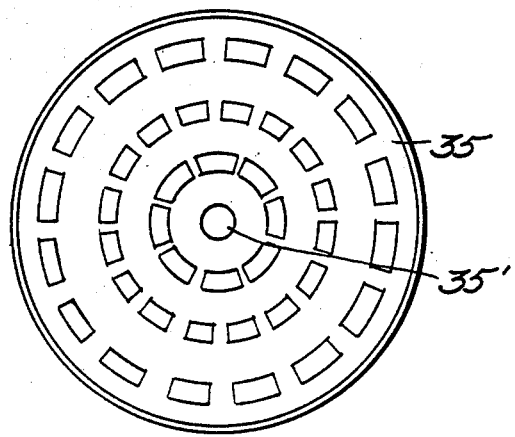
FIG. 2 is a top plan view of the screen lid of the coffee maker of FIG. 1.
Figure 3:
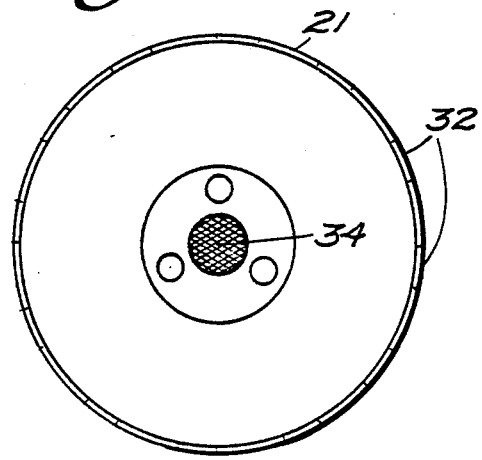
FIG. 3 is a bottom view of the basket supporting tube base of the coffee maker of FIG. 1.

As shown in FIGS. 1 and 3, the base 21 supporting the tube 20 preferably has a plurality of openings 32 formed around the periphery thereof. This facilitates the movement of the water upwardly through the tube 20. Additionally, a screen 34 is mounted at the bottom of the tube 20 in the base 21, for keeping the coffee clear of coffee particles. A second screen 35 also is provided, as shown in FIGS. 1, 2, and 4, the screen 35 being mounted within the lid 18; the screen 35 having means defining an opening 35' (see FIG. 2) therein for receipt of the tube 20 to hold the tube in place extending into the transparent dome 20, with the top of the tube above the screen 35. The fit provided by the opening 35' is snug which properly supports the tube in the pot 12 — which is especially important since the basket is located adjacent the base 21 of the tube 20, and provides no guiding or supporting function — and heat transfer from the pot is facilitated thereby.

While the glass dome 19 may be located in the lid 18 by any conventional means, a preferred way for mounting the dome 19 is to provide a circumferential ridge 36 therein, and provide a washer 37 of resilient sealing material disposed around the dome 19 at the ridge 36, and sealingly engaging the ridge 36 and lid 18.

Exemplary whistle means 30 according to the present invention are shown most clearly in FIGS. 1, 5, and 6. The whistle means 30 may comprise a metallic hollow cap 40 having a closed top 41, opened bottom 42 and means defining at least one opening 43 in a side portion thereof. The open bottom 42 of the cap 40 is mountable on the spout 17, and if desired a rubber gasket 45 or the like can be provided for effecting secure and tight — yet releasable — inner engagement between the cap 40 and the spout 17. Of course a wide variety of other means could also be provided for releasably attaching the cap 40 to the spout 17, such as an interference fit between the components 40, 17, etc. Such an interference fit, or a rubber gasket 45, provides means for mounting the whistle means 30 to the spout 17 so that it is readily removable, and preferably a grasping knob 46 of heat nonconductive material (i.e. wood or plastic) is provided on the closed top 41 of the hollow cap 40.

The whistle means 30 further comprises a plate 47 disposed in the cap 40 (see FIG. 5), and means defining a restricted opening 48 in the plate 47 directly adjacent the cap opening 43, steam passing through the restricted opening 48 causing a whistling sound and then exiting through the opening 43. Preferably, a pair of openings 43 are provided in opposite side portions of the hollow cap 40, and a pair of restricted openings 48 are defined in the plate 47 directly adjacent the cap openings 43. While it is preferred that the whistle means 30 be removable, the openings 48, 43 define passageways that allow pouring of liquid through the spout even with a whistle means 30 mounted on the spout 17. Especially when the whistle means 30 are constructed so that liquid may be poured therethrough, it is desirable to provide a venting assembly on the lid 18 to facilitate pouring. An exemplary venitng assembly is illustrated generally at 50 in FIGS. 1 and 7, and includes means defining an opening 52 in lid 18, a plate 54 pivoted about point 55 and movable from a position wherein it covers hole 52 (dotted line in FIG. 7), to a position wherein it uncovers hole 52 (solid line in FIG. 7), and a handle portion 56 of the plate 54 for easy pivoting thereof.

In utilizing the coffee maker 10 according to the present invention, the lid 18 is removed, as well as the tube 20 and basket 24, from the interior of the pot 12. Two quarts of cold water are poured into the pot 12, two ounces of coffee are placed into the basket 24, and the top 28 is placed securely in engagement with the basket 24, and the basket 24 is mounted on the tube 20 by passing the tube 20 through the receiving portion 26 of basket 24. Then the tube, with basket 24 mounted thereon, is placed back inside the pot 12. The lid 18 is placed on the pot 12, closing the top opening 15, the opening 35' in screen 35 mounted in lid 18 receiving the tube 20 and snuggly holding it in place so that it extends upwardly into the glass dome 19.

The coffee maker 10 is then placed on a burner, or another heat source is provided adjacent the bottom 13 of the coffee maker 10. Once the water starts boiling in the pot 12, steam will escape through the openings 48, 43 of whistle means 30 and provide an audible indication that boiling has been initiated. Opening 52 is covered by plate 54 while the coffee maker 10 is on the burner. Once whistling has initiated, the water is allowed to boil for about five minutes, and the strength of the coffee may be observed through the glass dome 19. The lid 18 can be removed and the tube 20, with basket 24, lifted out after about five to ten minutes to keep the coffee from getting too strong if observance of the coffee through the dome 19 indicates that that is happening. Once the coffee is at the desired strength, one merely grasps the insulated wrap 16' of handle 16, moves plate 54 so that it uncovers hole 52, and pours the coffee through the passageways 48 and 43 of the whistling means 30. To provide a faster pour the non-heat conductive knob 46 of the metallic cap 40 of the whistle means 30 be grasped, and the cap 40 removed from the spout 17, whereby unrestricted pouring of coffee through the spout 17 is provided.

Thus, it will be seen that according to the present invention, an improved coffee pot having visual and audible indicating means, and facilitating the making of a given amount of coffee with less coffee grounds, has been provided. The coffee maker also is essentially boil-over proof. While the invention is herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A coffee maker comprising
   a pot having a closed bottom, a circumferentially continuous sidewall, and an open top,
   a handle extending from the sidewall,
   a spout extending from a portion of the side wall opposite the handle,
   a lid for closing the open top, and including a dome of transparent material located centrally in the lid,
   a tube supported by a hollow base, the tube being of a length such that when the tube base is disposed on the pot bottom, supporting the tube, the top of the tube extends into the dome of transparent material, and said tube having a basket supporting manifestation formed thereon,
   a basket having a tubular central portion with a diameter only slightly greater than the tube diameter, and a perforated continuous side wall and a perforated bottom, and
   whistle means disposed on said spout for indicating when boiling of water in said pot has been initiated by audibly releasing built-up steam from said pot.

2. A coffee maker as recited in claim 1 further including means for mounting said whistle means to said spout so that it is readily removable, including a nonheat conductive knob formed on said whistle means.

3. A coffee maker as recited in claim 2 wherein said mounting means comprises a rubber gasket.

4. A coffee maker as recited in claim 1 wherein said whistle means includes passageways therein for allowing pouring of liquid through said spout with said whistle mounted on said spout.

5. A coffee maker as recited in claim 1 wherein said whistle means comprises a metallic hollow cap having an open bottom, closed top, and means defining at least one opening in a side portion thereof; a plate disposed in said cap adjacent said cap opening; and means defining a restricted opening in said plate directly adjacent said cap opening, steam passing through said restricted opening causing a whistling sound.

6. A coffee maker as recited in claim 5 further comprising a grasping knob of heat nonconductive material formed on the closed top of said metallic hollow cap.

7. A coffee maker as recited in claim 5 wherein means defining a pair of openings in opposite side portions of said hollow cap are provided, and means defining a pair of opposite restricted openings in said plate directly adjacent said cap openings are provided.

8. A coffee maker as recited in claim 1 further comprising a screen disposed on the bottom of said tube adjacent the tube base.

9. A coffee maker as recited in claim 1 or claim 8 further comprising a liquid filtering screen formed in said lid and having means defining an opening therein for snug receipt of said tube to hold said tube in place extending into said transparent dome, with the top of the tube above said screen.

10. A coffee maker as recited in claim 1 wherein said tube base has a plurality of openings formed around the bottom periphery thereof.

11. A coffee maker as recited in claim 1 wherein said basket forming manifestation is formed on said tube closer to the bottom of said tube than to the top of the tube, and so that the basket will be immersed in water during normal operation.

12. A coffee maker as recited in claim 1 or claim 4 further comprising means for venting the pot during pouring, said means comprising means defining an opening in said lid, and manually operated means for selectively covering or uncovering said opening.

* * * * *